Oct. 29, 1963     L. L. BLACKWELL     3,109,141

METERING DEVICE ELECTROSTATIC VOLTAGE

Filed Dec. 5, 1960

INVENTOR.
LYMAN L. BLACKWELL
BY

*ATTORNEY*

3,109,141
ELECTROSTATIC VOLTAGE METERING DEVICE
Lyman L. Blackwell, Denver, Colo., assignor to B. K. Sweeney Manufacturing Co., Denver, Colo., a corporation of Colorado
Filed Dec. 5, 1960, Ser. No. 73,585
4 Claims. (Cl. 324—123)

This invention relates to means for metering the voltage in an electrical circuit and more particularly to a test device for metering and measuring voltages in high impedance electrical sources for use in fault locating and for accurate electronic designing.

The current output of exceedingly high impedance sources is so slight that any attempt to measure the output by conventional volt meters results in so much power being drawn from the source by the volt meter that resulting measurements are exceedingly inaccurate.

The principal object of this invention is to provide a measuring circuit and a metering device which can be connected to a high impedance source without consuming any of the current characteristics of the source so as to obtain an accurate measurement of the electrical values of the source.

A further object is to provide a high input impedance amplifying circuit which can be used to obtain a relatively large power amplification of a high impedance input without disturbing the normal operation and characteristics of the circuit being metered and to provide means for matching a high impedance signal circuit to a low impedance meter circuit without affecting an electrical connection between the two circuits so that the impedance of the high impedance input circuit will not be disturbed and to provide a vacuum tube construction which will accomplish the latter result.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
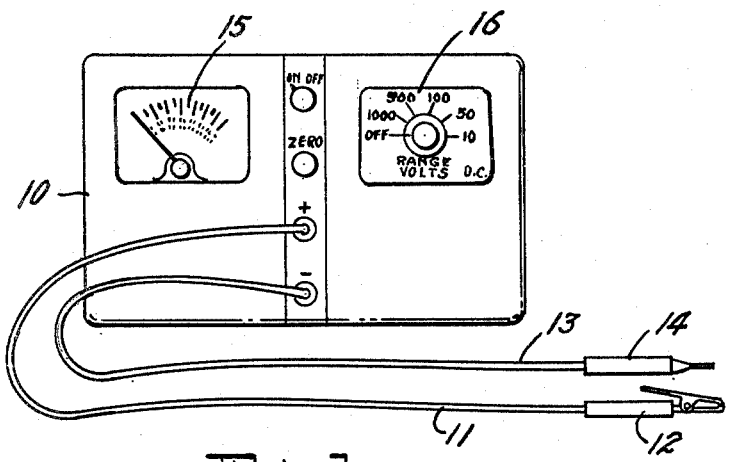
FIG. 1 is a front elevational view of the improved electronic metering device.

Briefly, the circuit employed includes a meter circuit; including a battery, an electro-responsive meter, and the cathode and plate of a vacuum tube; and an input circuit, including the signal circuit being metered, the cathode of the electronic tube and a metallic element proximate to the tube but exteriorly of and completely insulated from all of the conventional tube elements. Voltage impressed upon this external metallic element from the signal circuit retards the flow of electrons from the cathode to the plate in the meter circuit to effect an amplified and accurate reading on the meter in the meter circuit. When properly calibrated, a direct reading can be obtained on the meter of the voltage in the signal circuit. Since the input circuit is completely open, that is, the test leads are fully-insulated from each other and from all other circuit elements, the characteristics of the signal circuit being tested are not affected in any way so that a true wide range voltage reading can be obtained of exceedingly feeble currents in high impedance circuits of low amperage.

One embodiment of the invention is illustrated on the accompanying drawing mounted in a suitable, portable cabinet 10 from which a ground test lead 11, preferably terminating in a suitable alligator clip 12, and a probe lead 13, preferably terminating in a test probe 14, extends. The cabinet 10 is also provided with a voltmeter 15, a range control resistor 16, a filament battery 17 and a power battery 18. The range control resistor may be of a variable type or may consist of a plurality of selective resistors of preset resistances any one of which can be placed in the circuit by a select knob on the cabinet.

Figure 2:
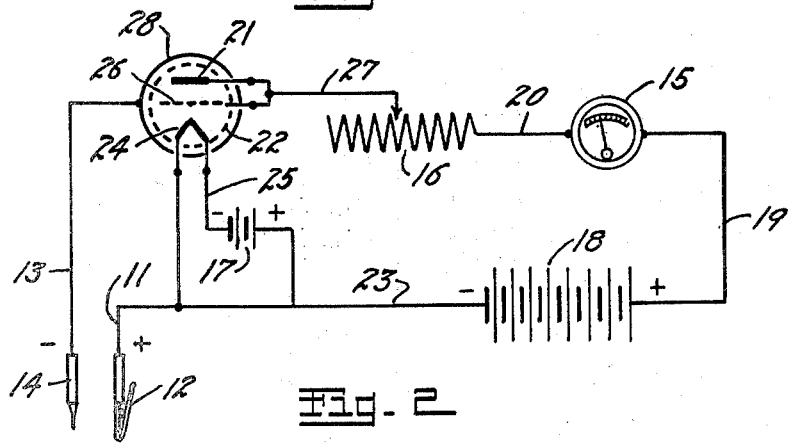
FIG. 2 is a circuit diagram of the basic circuits embodied in the device of FIG. 1.

The basic circuit is illustrated in FIG. 2 in which a conductor 19 leads from the positive pole of the power battery 18 to the meter 15 and a conductor 20 leads from the meter to the resistor 16. The resistor 16 is connected to the plate electrode 21 of an electronic tube 22 through a conductor 27. The negative pole of the power battery is connected through a conductor 23 with one side of a cathode electrode 24 in the tube 22. As illustrated, the cathode electrode 24 is of the filament type energized from the filament battery 17 through a filament conductor 25. In the circuit illustrated, the tube 22 is a triode having a grid 26 which is connected to the plate electrode 21 to increase the plate surface. If a four-element tube having two grids is employed, both grids would be connected to the plate electrode to still further increase the positive plate area. In any event, the tube must be of a type in which the plate electrode does not surround but is positioned to one side of the cathode electrode.

The open circuit characteristics of the input circuit are accomplished through the medium of an external metallic electrode element 28 in close proximity to the tube 22. If the tube be a glass tube the external electrode element can be placed directly against the glass; in other types of tubes it can be separated from the tube by suitable insulation. In all cases, the external electrode element is completely insulated from the instrument chassis and from all internal tube elements.

Figure 3:
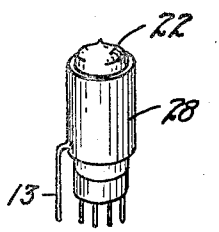
FIG. 3 is a detail perspective view of an electronic tube as employed in the circuit of FIG. 2.
Figure 4:
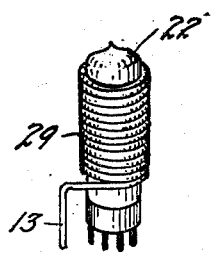
FIG. 4 is a similar detail perspective view of an alternate form of the electronic tube of FIG. 3.

The external electrode element may have any suitable size and shape. It may comprise a metal plate positioned against the side of the tube or an electrical conducting paint applied to the external surface of the tube. As illustrated in FIGS. 2 and 3, the external electrode comprises a cylindrical metallic sleeve completely surrounding the medial portion of the glass tube and connected to the test lead 13. An alternate form of external electrode element may consist of a coil of wire wrapped about the glass tube as shown at 29 in FIG. 4. The wire turns may contact each other since there is no current flow. In any event, the wire terminates in an open extremity so that it does not have any electro-magnetic effect upon the tube elements. Since current cannot flow through the external electrode element and since the latter is insulated from all other electrode elements, the only possibility of current flow in the input circuit would be an exceedingly slight leakage current.

Apparently, when the test leads 11 and 13 are connected to the signal circuit to be tested with the probe 14 connected into the signal circuit to impress a negative potential upon the external electrode 28 or 29, the external electrode superimposes a negative field between the cathode and the plate of the tube which resists the electron flow to the plate 21 in direct proportion to the strength of the field voltage. The electron flow is also directly proportional to the strength of the current in the meter circuit. Therefore, by properly calibrating the meter 15 for various presettings of the resistor 16 the voltages in signal circuits can be read directly within the limits of various ranges.

While a specific form of the improvement has been described and illustrated herein, it is to be understood that the same may be varied within the scope of the appended claims, without departing from the spirit of the invention.

Having thus described the invention what is claimed and desired to be secured by Letters Patent is:

1. Means for metering the voltage in a high impedance low amperage circuit comprising an evacuated electronic tube containing a cathode and a plate electrode; a metering circuit including the plate electrode and cathode of said tube; an external electrode in close proximity to said tube and completely insulated from said metering circuit; a first test lead connected to said cathode; and a second test lead connected to said external electrode, said second test lead being arranged for connection in said high impedance low amperage circuit to impress a negative polarity from said high impedance low amperage circuit upon said external electrode, and said first test lead being arranged to receive a positive potential from said high impedance low amperage circuit.

2. Means for metering the voltage in a signal circuit comprising: a meter circuit including in series a power source, an electro-responsive meter, and the cathode and plate of an electronic tube and an input circuit including a first test lead connected to said cathode, an external electrode approximate to said tube and insulated from both said cathode and said plate electrode and a second test lead connected to and extending from said external electrode, said test leads being adapted to contacting the signal circuit to be metered, said second test lead being the only electrical contact with said external electrode.

3. A low impedance meter circuit for metering a high impedance signal circuit without disturbing the impedance of the high impedance circuit comprising: an electronic tube containing a cathode, a grid and a plate, said grid and plate being connected in parallel; a voltmeter; a battery; a first test probe; a second test probe, said probes being adapted for contacting said high impedance signal circuit; a meter circuit from said parallel-connected grid and plate through said meter and through said battery to said cathode; means for varying the resistance of said meter circuit; a first connection from one of said test probes to said cathode; an external electrode element surrounding said electronic tube and being electrically insulated from the cathode, the grid, the plate and from the meter circuit; and a second single connection from said external electrode element to the other of said test probes, there being no other metallic electric path from either said external electrode or said other test probe.

4. Means for metering the voltage in a circuit comprising a direct current power source, a meter, a resistance and an electron tube having a cathode and plate, all arranged in series, with the positive end of the power source connected with the plate and the negative end connected to the cathode, a test lead connected to the cathode and, a second test lead having a winding influencing the current flow through the tube, said winding being connected at one end to the second test lead, and wrapped about the tube, with the farther end of the winding free of any connection with the circuitry.

References Cited in the file of this patent

UNITED STATES PATENTS

| | | |
|---|---|---|
| 1,278,535 | Weagant | Sept. 10, 1918 |
| 1,645,057 | Junken | Oct. 11, 1927 |
| 1,656,187 | Farrand | Jan. 17, 1928 |
| 1,810,063 | Thomas | June 16, 1931 |
| 2,531,609 | Bulgin | Nov. 28, 1950 |